United States Patent
Imaoka (10) Patent No.: US 8,451,547 B2
(45) Date of Patent: May 28, 2013

(54) WIDE ANGLE LENS

(75) Inventor: Takuya Imaoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 169 days.

(21) Appl. No.: 12/992,999

(22) PCT Filed: Apr. 17, 2009

(86) PCT No.: PCT/JP2009/001771
§ 371 (c)(1),
(2), (4) Date: Nov. 16, 2010

(87) PCT Pub. No.: WO2009/139114
PCT Pub. Date: Nov. 19, 2009

(65) Prior Publication Data
US 2011/0069399 A1  Mar. 24, 2011

(30) Foreign Application Priority Data

May 16, 2008 (JP) ................. 2008-129625

(51) Int. Cl.
*G02B 3/04* (2006.01)
*G02B 9/12* (2006.01)

(52) U.S. Cl.
USPC .......................... 359/716; 359/784

(58) Field of Classification Search
USPC ............... 359/716, 753, 770, 784, 761, 781
See application file for complete search history.

(56) References Cited

U.S. PATENT DOCUMENTS

| 7,218,461 B2 * | 5/2007 | Sano ............... 359/791 |
| 7,301,712 B2 * | 11/2007 | Kamo ............... 359/785 |
| 7,397,612 B2 * | 7/2008 | Chen et al. ......... 359/716 |
| 7,471,465 B2 | 12/2008 | Yamashita et al. |
| 7,961,408 B2 * | 6/2011 | Lo et al. ........... 359/753 |
| 2008/0130128 A1 | 6/2008 | Yamashita et al. |

FOREIGN PATENT DOCUMENTS

| JP | 2003-195161 A | 7/2003 |
| JP | 2005-181596 A | 7/2005 |
| JP | 2006-209028 A | 8/2006 |
| JP | 2007-025499 A | 2/2007 |
| JP | 2007-114546 A | 5/2007 |
| JP | 2008-134540 A | 6/2008 |

OTHER PUBLICATIONS

Geary, Joseph M. Introduction to Lens Design: With Practical ZEMAX Examples. Richmond, VA: Willmann-Bell, 2002. 23. Print.*
International Search report for PCT/JP2009/001771 dated May 19, 2009.

* cited by examiner

*Primary Examiner* — Zachary Wilkes
(74) *Attorney, Agent, or Firm* — Pearne & Gordon LLP (57) ABSTRACT

An easily manufacturable wide angle lens with less possibility of distortion even using a small number of lenses has a first lens which is a spherical meniscus lens having negative power and whose convex surface faces an object; the second lens which is an aspherical meniscus lens having negative power along an optical axis and has positive power off the optical axis and whose convex surface faces the object side; the third lens having positive power in order from an object side, and an aperture. The Abbe number of the second lens is 30 or less; the ratio between the diagonal length of an imaging device placed on an image plane and the focal length of the whole lens system is 0.26 or less; and the ratio between the focal length of the third lens and the focal length of the whole lens system is less than 1.5.

1 Claim, 5 Drawing Sheets

SPHERICAL ABERRATION [mm]

Fig.2B

ASTIGMATISM [mm]

Fig.2C

DISTORTION [%]

Fig.3A

SPHERICAL ABERRATION [mm]

Fig.3B

ASTIGMATISM [mm]

DISTORTION [%]

SPHERICAL ABERRATION [mm]

Fig.4B

ASTIGMATISM [mm]

Fig.4C

DISTORTION [%]

WIDE ANGLE LENS

RELATED APPLICATIONS

This application claims the benefit of Japanese Patent Application No. 2008-129625 filed on May 16, 2008 in Japan, the contents of which are incorporated herein by reference.

TECHNICAL FIELD

The present invention relates to a wide angle lens that is used for a small camera, such as an in-vehicle camera, a cell phone camera, a PC camera, and a surveillance camera, which uses an imaging device, such as a CCD (charge coupled device) and a CMOS (complementary metal oxide semiconductor).

BACKGROUND ART

In recent years, a small and inexpensive wide angle lens having an angle of view of 150 degrees or more is demanded as a lens to be used in a small camera, such as an in-vehicle camera.

The following Japanese Patent Laid-Open Applications Nos. 2005-181596, 2006-209028, and 2007-114546 disclose a lens that uses three lenses to achieve a wide angle of view.

SUMMARY OF THE INVENTION

Problems to be Solved by the Invention

In a wide angle lens described in Japanese Patent Laid-Open Application No. 2005-181596, a first lens has negative power and a second lens has positive power. The first lens, which is placed closest to the object side, is a small lens whose radius of curvature of the lens surface on the image plane side is 2.20 to 2.88 mm (see Tables 1A, 2A, and 3A in Japanese Patent Laid-Open Application No. 2005-181596). For this reason, it is difficult to form the first lens though it is a spherical lens, and this would be a problem. Wide-angle lenses described in Japanese Patent Laid-Open Applications Nos. 2006-209028 and 2007-114546 achieve a wide angle by increasing their distortion. In these wide angle lenses, distortion (absolute value) at a diagonal point of the imaging device far exceeds 50% (see FIGS. 3 and 4 in Japanese Patent Laid-Open Application No. 2006-209028 and FIGS. 38 to 49 in Japanese Patent Laid-Open Application No. 2007-114546). This causes an image in the periphery to be small and hard to be seen, which would be a problem.

A purpose of the invention made in view of the above-mentioned background is to provide a wide angle lens which can easily be manufactured and whose distortion can be made small even when the lens uses a small number of lenses.

Means for Solving the Problems

A wide angle lens according to the invention is a lens system having: a first lens, a second lens, and a third lens which are arranged in order from an object side; and an aperture provided between the second lens and the third lens, and the wide angle lens has a configuration in which: the first lens is a spherical meniscus lens which has negative power and whose convex surface faces an object; the second lens is an aspherical meniscus lens which has negative power along an optical axis and has positive power off the optical axis and whose convex surface faces the object side; the third lens is a lens which has positive power; the Abbe number of the second lens is 30 or less; the ratio between the diagonal length D of an imaging device placed on an image plane of the lens system and the focal length f of the whole of the lens system, f/D, is 0.26 or less; and the ratio between the focal length f3 of the third lens and the focal length f of the whole of the lens system, f3/f, is less than 1.5.

In this configuration, since both the first lens and the second lens have negative power, the negative power can be distributed between the two lenses. This can increase the radius of curvature of the surface on the image plane side of the first lens and facilitate the formation of the first lens. Since the second lens is an aspherical meniscus lens whose convex surface faces the object side and the convex surface on the object side of the second lens is an aspherical surface which has negative power along the optical axis and has positive power off the optical axis, no inflection point is formed in the aspherical shape of the convex surface, and therefore a mold for the second lens can easily be built. In addition, since the ratio between the diagonal length D of an imaging device and the focal length f of the whole lens system, f/D, is 0.26 or less and since the ratio between the focal length f3 of the third lens and the focal length f of the whole lens system, f3/f, is less than 1.5, a wide angle lens with a small distortion can be provided, and the back focus can be made long by satisfying f3/f<1.5 even if the focal length f of the whole lens system is short. If f/D is more than 0.26, the focal length f of the whole lens system would be long, and therefore a wide angle of view cannot be obtained unless distortion is increased. If f3/f is 1.5 or more, the back focus would be too short and, for example, when the third lens moves for focus adjustment or the like, the third lens may come in contact with a cover glass provided between the imaging device and the third lens and may be damaged. As described above, the invention allows the lenses to be easily manufactured and allows distortion to be decreased even when a small number of lenses are used.

In the wide angle lens according to the invention, the third lens may be an aspherical lens. This allows the angle of incidence of a light beam on the periphery of the imaging device to be corrected to be parallel, and can improve the performance.

In the wide angle lens according to the invention, the second lens may be made of a resin material. This can facilitate the formation of the shape of the second lens. In particular, this can facilitate the formation of the aspherical surface on the second lens and allows it to be inexpensive.

In the wide angle lens according to the invention, the third lens may be made of a resin material. This can facilitate the formation of the shape of the third lens. In particular, this can facilitate the formation of an aspherical surface on the third lens and allows it to be inexpensive.

In the wide angle lens according to the invention, the first lens may be made of a glass material. This allows the inside of the wide angle lens to be protected from various troubles and allows the wide angle lens to be resistant to various types of environment.

ADVANTAGES OF THE INVENTION

In the invention, the first lens, the second lens, and the third lens are arranged in order from the object side, where: the first lens is a spherical meniscus lens which has negative power and whose convex surface is formed on the lens surface on the object side; the second lens is an aspherical meniscus lens which has negative power along the optical axis and has positive power off the optical axis and whose convex surface is formed on the lens surface on the object side; the third lens is a lens which has positive power; the Abbe number of the second lens is 30 or less; the ratio between the diagonal length D of the imaging device and the focal length f of the whole of the lens system, f/D, is 0.26 or less; and the ratio between the focal length f3 of the third lens and the focal length f of the whole of the lens system, f3/f, is less than 1.5. The invention can thus provide a wide angle lens whose lenses can be easily manufactured and whose distortion can be decreased even when a small number of lenses are used.

There are other aspects of the invention as described below. This disclosure of the invention therefore intends to provide part of the aspects of the invention and does not intend to limit the scope of the invention described and claimed herein.

BEST MODE OF EMBODYING THE INVENTION

The following is a detailed description of the invention. It will be understood that the embodiment described below is only an example of the invention, and the invention can be varied in various aspects. Therefore, the specific configurations and functions disclosed below do not limit the claims.

A wide angle lens according to the embodiment of the invention will be described with reference to the drawings.

Figure 1:
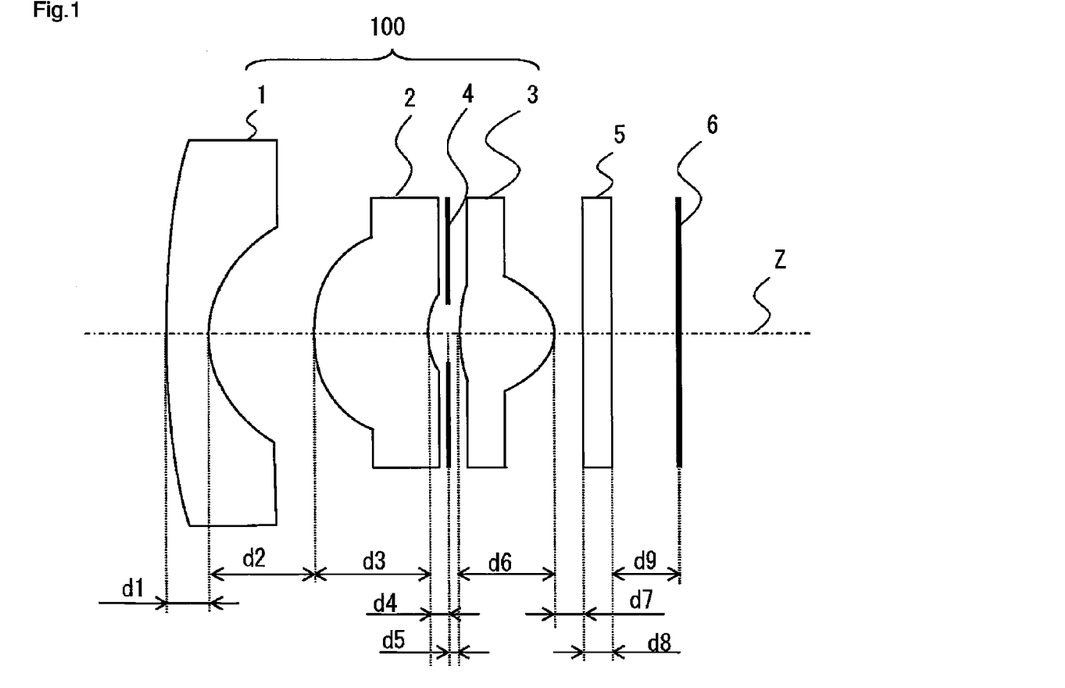
FIG. 1 shows a configuration of a wide angle lens of an embodiment of the invention.

FIG. 1 shows a configuration of the wide angle lens of the embodiment of the invention. In FIG. 1, a section through components of the wide angle lens cut along a plane including an optical axis Z is shown, where the left side of the paper is the object side and the right side of the paper is the image plane side. As shown in FIG. 1, the wide angle lens 100 comprises an optical system having a first lens 1, a second lens 2, a third lens 3, and an aperture 4. The first lens 1, the second lens 2, and the third lens 3 are arranged along the optical axis Z in order from the object side. The aperture 4 is placed between the second lens 2 and the third lens 3. A cover glass 5 and an imaging device 6 are placed on the image plane side of the wide angle lens 100.

The first lens 1 is a meniscus-shaped spherical lens which has negative power and whose convex surface faces the object side. Preferably, the Abbe number of the first lens 1 is 40 or more and the refractive index of it is 1.7 or more. An Abbe number of 40 or more can facilitate correction of chromatic aberration, and a higher refractive index allows the radius of curvature of the lens to be increased and can facilitate the formation of the lens. The first lens 1 is made of a glass material. This allows the inside of the wide angle lens to be protected from various troubles and allows the lens to be resistant to various types of environment. The first lens 1 is made of a glass material in the embodiment, but alternatively the first lens 1 may be made of a resin material.

The second lens 2 is a meniscus-shaped aspherical lens whose convex surface faces the object side. The convex aspherical surface is formed such that it has negative power along the optical axis and has positive power off the optical axis. This allows chromatic aberration of magnification to be corrected for a light beam off the optical axis. In order to correct chromatic aberration better, both surfaces of the second lens 2 (the surface on the object side and the surface on the image plane side) are preferably made to be aspherical. The Abbe number of the second lens 2 is 30 or less. This allows the second lens 2 to efficiently correct chromatic aberration. The second lens 2 is made of a resin material. This can facilitate the formation of the shape of the second lens 2. In particular, this can facilitate the formation of the aspherical surface on the second lens 2 and allows it to be inexpensive. The second lens 2 may be made of a resin material or of a glass material.

The third lens 3 is an aspherical lens which has positive power. This allows the third lens 3 to efficiently correct chromatic aberration and to correct the angle of incidence of a light beam on the periphery of the imaging device to be parallel, and can improve the performance. The Abbe number of the third lens 3 is 50 or more. This allows the third lens 3 to efficiently correct chromatic aberration. The third lens 3 is preferably an aspherical lens, but may alternatively be spherical. The third lens 3 is made of a resin material. This can facilitate the formation of the shape of the third lens 3. In particular, this can facilitate the formation of the aspherical surface on the third lens 3 and allows it to be inexpensive. The third lens 3 may be made of a resin material or of a glass material.

The aperture 4 is placed between the second lens 2 and the third lens 3, and adjusts the amount of light incident from the second lens 2 on the third lens 3. The cover glass 5 may have a function to seal the imaging device 6. The cover glass 5 may have properties as a filter that transmits light in a certain wavelength region or as a low-pass filter. The imaging device 6 is placed on the image plane of the lens system, and images an image formed by the lens system.

The wide angle lens 100 of the embodiment has optical properties that meet the conditions of the following expressions (1) and (2):

[Mathematical Expression 1]

$$f/D < 0.26 \tag{1}$$

[Mathematical Expression 2]

$$f3/f < 1.5 \tag{2}$$

where
D is the diagonal length of the imaging device 6;
f is the focal length of the whole lens system; and
f3 is the focal length of the third lens 3.

In the wide angle lens according to the embodiment, since both the first lens 1 and the second lens 2 have negative power, the negative power can be distributed between the two lenses. This can increase the radius of curvature of the surface on the image plane side of the first lens 1 and facilitate the formation of the first lens 1. The object side of the first lens 1 being convex allows the angle of incidence of light on the first lens 1 to be close to perpendicular. For example, angular dependence can be reduced for a case where an anti-reflection coating is evaporated onto the surface on the object side of the first lens 1. Since the second lens 2 is an aspherical meniscus lens whose convex surface faces the object side and the convex surface on the object side of the second lens 2 is an aspherical surface which has negative power along the optical axis and has positive power off the optical axis, no inflection point is formed in the aspherical shape of the convex surface, and therefore a mold for the second lens 2 can easily be built.

The Abbe number of the second lens 2 is 30 or less, the aspherical convex surface on the object side of the second lens 2 has positive power off the optical axis, and the first lens 1 has negative power. This allows chromatic aberration of magnification to be corrected for a light beam off the optical axis. Consequently, chromatic aberration of magnification of the whole lens system can be reduced. If the Abbe number of the second lens 2 exceeds 30, chromatic aberration of magnification of the whole lens system increases and the periphery of the imaging device cannot provide a good image.

In addition, since the ratio between the diagonal length D of the imaging device and the focal length f of the whole lens system, f/D, is 0.26 or less and since the ratio between the focal length f3 of the third lens 3 and the focal length f of the whole lens system, f3/f, is less than 1.5, a wide angle lens with a small distortion can be provided, and the back focus can be made long by satisfying f3/f<1.5 even if the focal length f of the whole lens system is short. If f/D is more than 0.26, the focal length f of the whole lens system would be long, and therefore a wide angle of view cannot be obtained unless distortion is increased. If f3/f is 1.5 or more, the back focus would be too short and, for example, when the third lens 3 moves for focus adjustment or the like, the third lens 3 may come in contact with the cover glass provided between the imaging device 6 and the third lens 3 and may be damaged.

As described above, the embodiment allows the lenses to be easily manufactured and allows distortion to be decreased even when as few as three lenses are used.

In the wide angle lens according to the embodiment, the third lens 3 is an aspherical lens, and therefore the angle of incidence of a light beam on the periphery of the imaging device can be corrected to be parallel, and the performance can be improved.

In the wide angle lens according to the embodiment, the second lens 2 is made of a resin material, and therefore the formation of the shape of the second lens 2 can be facilitated. In particular, the formation of the aspherical surface on the second lens 2 can be facilitated and it can be made to be inexpensive.

In the wide angle lens according to the embodiment, the third lens 3 is made of a resin material, and therefore the formation of the shape of the third lens 3 can be facilitated. In particular, the formation of an aspherical surface on the third lens 3 can be facilitated and it can be made to be inexpensive.

In the wide angle lens according to the embodiment, the first lens 1 is made of a glass material, and therefore the inside of the wide angle lens can be protected from various troubles and the wide angle lens can be made to be resistant to various types of environment.

EXAMPLES

Specific numerical examples of the wide angle lens according to the embodiment will next be described. Examples 1 to 3 described here correspond to the embodiment, and the configuration of lenses of Examples 1 to 3 is the same as that shown in FIG. 1.

In the description below, let Surface S1 be the surface on the object side of the first lens 1, Surface S2 be the surface on the image plane side of the first lens 1, Surface S3 be the surface on the object side of the second lens 2, Surface S4 be the surface on the image plane side of the second lens 2, Surface S5 be the aperture, Surface S6 be the surface on the object side of the third lens 3, Surface S7 be the surface on the image plane side of the third lens 3, Surface S8 be the surface on the object side of the cover glass, and Surface S9 be the surface on the image plane side of the cover glass, in order from the object side.

Surfaces S3, S4, S6, and S7 are aspherical dioptric surfaces. Let the x-axis be coaxial with the optical axis, let the y-axis be perpendicular to the optical axis, and suppose that the traveling direction of a light beam is the positive direction. Then, the shape of the aspherical surface is expressed by Equation (3) below:

[Mathematical Expression 3]

$$x = \frac{\frac{y^2}{r}}{1 + \sqrt{1 - \frac{(1+k)y^2}{r^2}}} + A_1 y^4 + A_2 y^6 + A_3 y^8 + A_4 y^{10} \quad (3)$$

where
r is the radius of curvature of the lens;
k is the conic constant of the aspherical surface;
$A_1$ is the 4th order aspherical coefficient;
$A_2$ is the 6th order aspherical coefficient;
$A_3$ is the 8th order aspherical coefficient; and
$A_4$ is the 10th order aspherical coefficient.

Example 1

Table 1 is lens data of the wide angle lens of Example 1.

TABLE 1

Lens Data
F-no.: 2.8, Focal length (f): 1.14 mm,
Diagonal length of the sensor (D): 4.50 mm, Angle of view (2ω): 153°,
Focal length of the third lens (f3): 1.70 mm,
f3/f: 1.490, f/D: 0.253,
Back focus (in glass): 2.2 mm

| Surface | Surface type | Radius of curvature | Distance between surfaces | Refractive index: nd | Abbe number: vd |
|---|---|---|---|---|---|
| S1 | Spherical | 42.822 | 0.950 | 1.804 | 46.5 |
| S2 | Spherical | 4.005 | 3.404 | — | — |
| S3 | Aspherical | 4.473 | 3.452 | 1.634 | 23.8 |
| S4 | Aspherical | 3.247 | 0.218 | — | — |
| S5 (Aperture) | Plane | — | 0.270 | — | — |
| S6 | Aspherical | 12.057 | 1.811 | 1.525 | 56.0 |
| S7 | Aspherical | −0.921 | 1.600 | — | — |
| S8 | Plane | — | 0.300 | 1.517 | 64.1 |
| S9 | Plane | — | 0.300 | — | — |

In Table 1, F-no. is the f-number; Focal length (f) is the focal length of the whole optical system of the wide angle lens 100 shown in FIG. 1; Diagonal length of the sensor (D) is the distance between diagonal points of the imaging device 6 (sensor); Angle of view (2ω) is the angle of view at a diagonal point of the imaging device 6; Focal length of the third lens 3 (f3) is the individual focal length of the third lens 3; f3/f is the ratio between the focal length of the third lens 3 and the focal length of the whole lens system; f/D is the ratio between the focal length of the whole lens system and the diagonal length of the sensor; and Back focus (in glass) represents the distance between the surface on the image plane side of the third lens 3 (Surface S7), which is the second surface of the third lens 3, and the surface on the object side of the imaging device 6 (the imaging surface or the sensor surface).

In Table 1, Surface type represents the shape of each of the surfaces S1 to S9. Radius of curvature is the radius of the surface, and no value is entered there when Surface type is Plane. Distance between surfaces is the distance along the optical axis from the specified surface to the next surface in order from the object side. As shown in FIG. 1, d1 represents the distance between Surfaces S1 and S2, d2 represents the distance between Surfaces S2 and S3, d3 represents the distance between Surfaces S3 and S4, . . . , and d9 represents the distance between Surface S9 and the surface on the object side of the imaging device 6 (the imaging surface). Refractive index nd is the refractive index at d line (587.56 nm) between the specified surface and the next surface in order from the object side. Abbe number vd is the Abbe number at d line between the specified surface and the next surface in order from the object side.

Table 2 shows constants and coefficients for specifying the aspherical shape of the lens surfaces that are specified as aspherical in Example 1. In Table 2, Conic constant (K) is the same as the conic constant (k) in Equation (3), and Aspherical coefficients A, B, C, and D correspond to $A_1$, $A_2$, $A_3$, and $A_4$ respectively in Equation (3).

TABLE 2

| Aspherical coefficients | | | | |
|---|---|---|---|---|
| | S3 | S4 | S6 | S7 |
| Conic constant (K) | 1.986 | 6.970 | 70.454 | −1.618 |
| 4th order coefficient (A) | 6.239E−03 | 3.114E−02 | −2.755E−01 | −8.736E−02 |
| 6th order coefficient (B) | 9.165E−04 | 3.080E−01 | 8.278E−01 | −1.075E−02 |
| 8th order coefficient (C) | −2.501E−04 | −5.294E−01 | −1.490E+00 | 1.809E−02 |
| 10th order coefficient (D) | 3.238E−05 | 7.353E−01 | 1.033E+00 | −8.421E−03 |

Figure 2A:
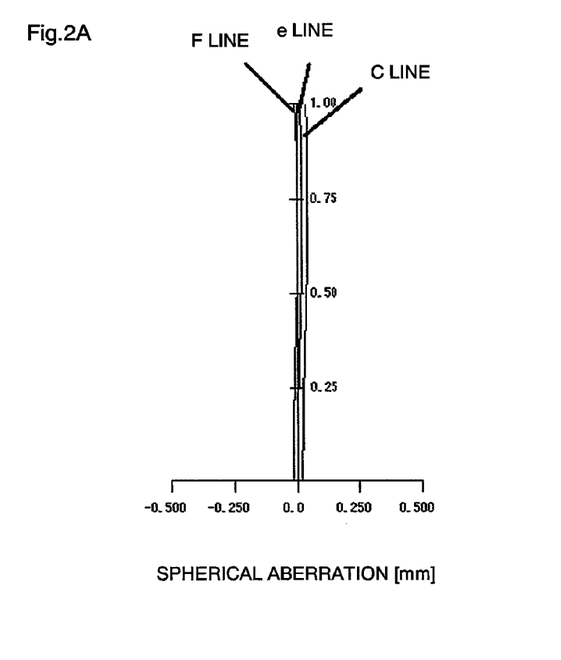
FIG. 2A is a spherical aberration diagram of a wide angle lens having lens data of Example 1.
Figure 2B:
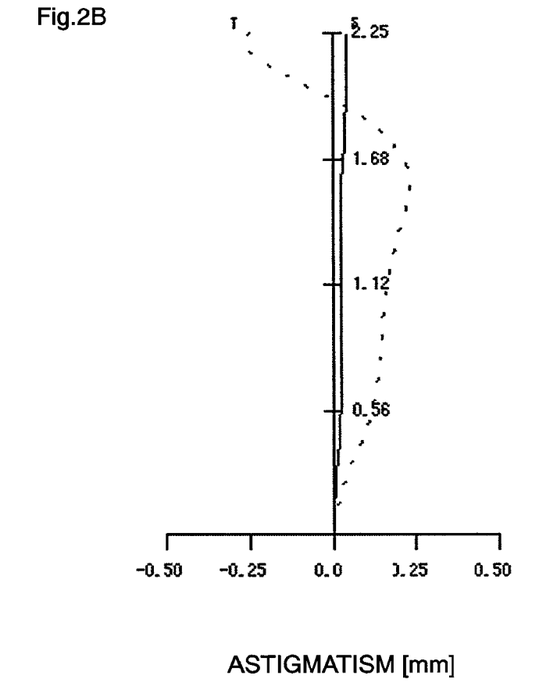
FIG. 2B is an astigmatism diagram of the wide angle lens having the lens data of Example 1.
Figure 2C:
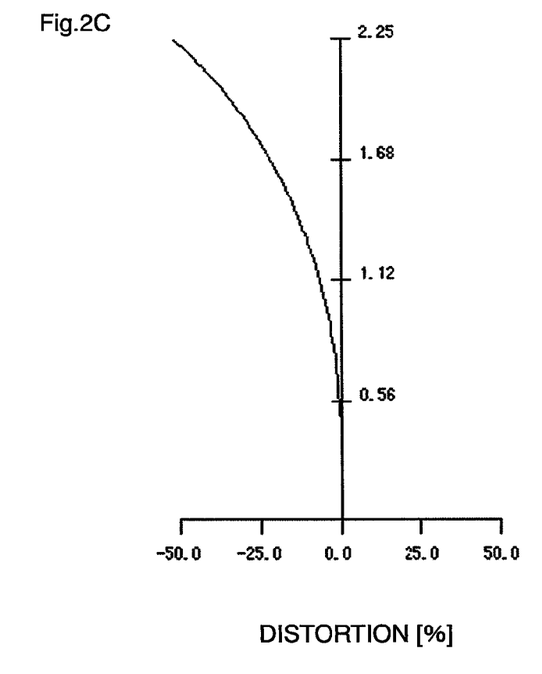
FIG. 2C is a distortion diagram of the wide angle lens having the lens data of Example 1.

FIGS. 2A to 2C are aberration diagrams of the wide angle lens having the lens data of Example 1. FIG. 2A is a spherical aberration diagram, FIG. 2B is an astigmatism diagram, and FIG. 2C is a distortion diagram. Each aberration diagram shows aberration using e line as a reference wavelength. The spherical aberration diagram (FIG. 2A) also shows aberration at C line and F line. In the astigmatism diagram (FIG. 2B), the solid line shows aberration in the sagittal direction and the dashed line shows aberration in the tangential direction. In the spherical aberration diagram (FIG. 2A), the vertical axis represents the f-number (F-no.) and the horizontal axis represents the amount of aberration (mm). In the astigmatism diagram (FIG. 2B), the vertical axis represents the image height (mm) and the horizontal axis represents the amount of aberration (mm). In the distortion diagram (FIG. 2C), the vertical axis represents the image height (mm) and the horizontal axis represents distortion for e line (%).

The aberration diagrams in FIGS. 2A to 2C gave Distortion (Di), Chromatic aberration of magnification (60%) C-e, and Chromatic aberration of magnification (60%) F-e as follows:
  Distortion (Di): −52.0%
  Chromatic aberration of magnification (60%) C-e: 9.5 µm
  Chromatic aberration of magnification (60%) F-e: −7.0 µm
  Distortion (Di) here is distortion at a diagonal point of the imaging device. Chromatic aberration of magnification (60%) C-e represents deviation of a principal ray of C line (wavelength 656.27 nm) on the image plane in a direction perpendicular to the optical axis with reference to e line (wavelength 546.07 nm) at a 60% point to a diagonal point of the imaging device. Chromatic aberration of magnification (60%) F-e represents deviation of a principal ray of F line (wavelength 486.13 nm) on the image plane in a direction perpendicular to the optical axis with reference to e line at a 60% point to a diagonal point of the imaging device.

Example 2

Table 3 is lens data of the wide angle lens of Example 2. Each symbol in Table 3 follows the description of Table 1.

TABLE 3

Lens Data
F-no.: 2.8, Focal length (f): 1.14 mm,
Diagonal length of the sensor (D): 4.5 mm, Angle of view (2ω): 152°,
Focal length of the third lens (f3): 1.67 mm,
f3/f: 1.465, f/D: 0.253,
Back focus (in glass): 2.15 mm

| Surface | Surface type | Radius of curvature | Distance between surfaces | Refractive index: nd | Abbe number: vd |
|---|---|---|---|---|---|
| S1 | Spherical | 23.198 | 0.950 | 1.773 | 49.6 |
| S2 | Spherical | 3.511 | 3.113 | — | — |
| S3 | Aspherical | 4.713 | 3.411 | 1.6142 | 26.0 |
| S4 | Aspherical | 3.448 | 0.218 | — | — |
| S5 (Aperture) | Plane | — | 0.270 | — | — |
| S6 | Aspherical | 8.819 | 1.560 | 1.5311 | 56.0 |
| S7 | Aspherical | −0.929 | 1.6 | — | — |
| S8 | Plane | — | 0.3 | — | — |
| S9 | Plane | — | 0.25 | — | — |

Table 4 shows constants and coefficients for specifying the aspherical shape of the lens surfaces that are specified as aspherical in Example 2. Each symbol in Table 4 follows the description of Table 2.

TABLE 4

| Aspherical coefficients | | | | |
|---|---|---|---|---|
| | S3 | S4 | S6 | S7 |
| Conic constant (K) | 2.236 | 0.000 | 0.000 | −1.436 |
| 4th order coefficient (A) | −1.301E−02 | −1.287E−03 | −2.539E−01 | −7.667E−02 |
| 6th order coefficient (B) | 8.295E−03 | 1.329E+00 | 9.255E−01 | −1.307E−02 |
| 8th order coefficient (C) | −1.450E−03 | −3.914E+00 | −1.589E+00 | 8.922E−03 |
| 10th order coefficient (D) | 1.083E−04 | 3.744E+00 | 1.010E+00 | −1.779E−03 |

Figure 3A:
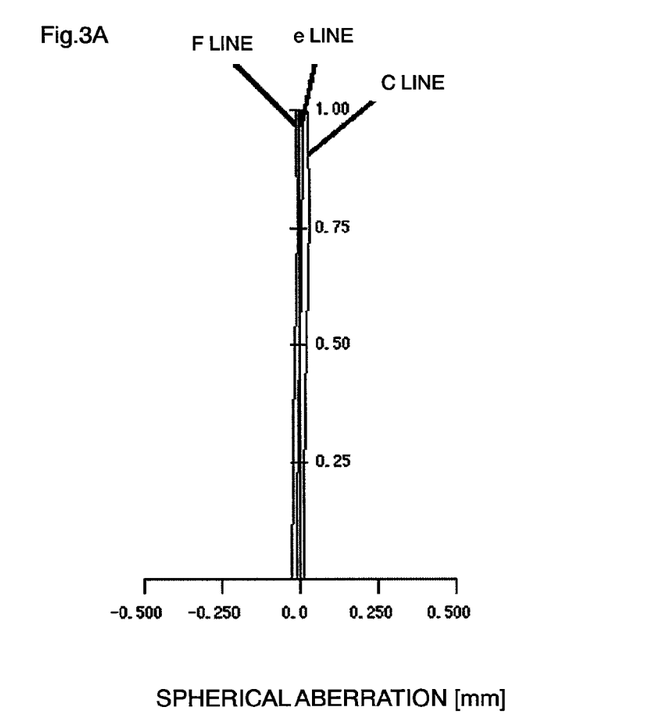
FIG. 3A is a spherical aberration diagram of a wide angle lens having lens data of Example 2.
Figure 3B:
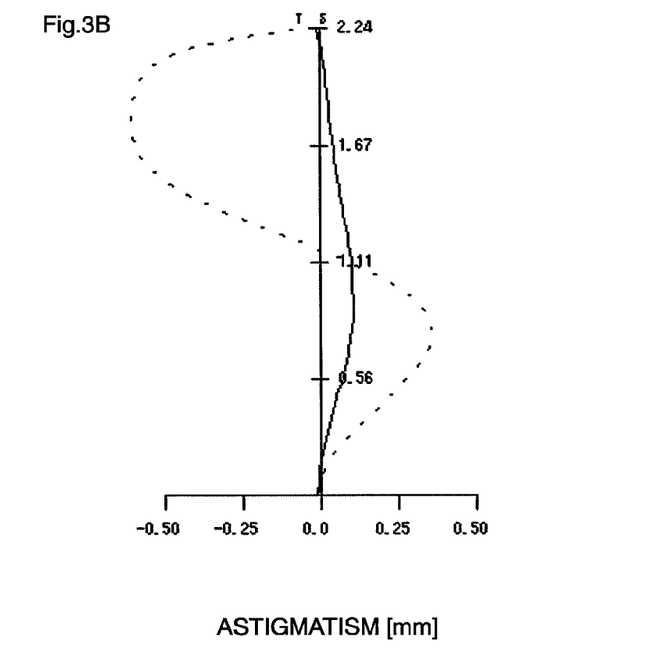
FIG. 3B is an astigmatism diagram of the wide angle lens having the lens data of Example 2.
Figure 3C:
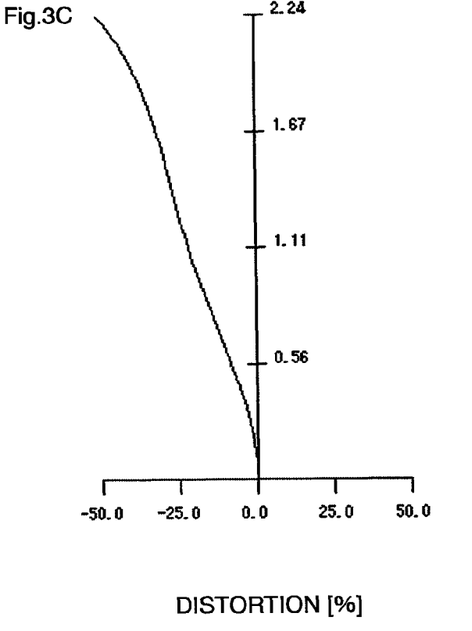
FIG. 3C is a distortion diagram of the wide angle lens having the lens data of Example 2.

FIGS. 3A to 3C are aberration diagrams of the wide angle lens having the lens data of Example 2. FIG. 3A is a spherical aberration diagram, FIG. 3B is an astigmatism diagram, and FIG. 3C is a distortion diagram. Each aberration diagram shows aberration using e line as a reference wavelength. The spherical aberration diagram (FIG. 3A) also shows aberration at C line and F line. In the astigmatism diagram (FIG. 3B), the solid line shows aberration in the sagittal direction and the dashed line shows aberration in the tangential direction. The vertical and horizontal axes of each aberration diagram follow the description of FIG. 2.

The aberration diagrams in FIGS. 3A to 3C gave Distortion (Di), Chromatic aberration of magnification (60%) C-e, and Chromatic aberration of magnification (60%) F-e as follows:

Distortion (Di): −52.2%
Chromatic aberration of magnification (60%) C-e: 15.6 μm
Chromatic aberration of magnification (60%) F-e: −12.5 μm Example 3

Table 5 is lens data of the wide angle lens of Example 3. Each symbol in Table 5 follows the description of Table 1.

TABLE 5

Lens Data
F-no.: 2.8, Focal length (f): 1.14 mm,
Diagonal length of the sensor (D): 4.5 mm, Angle of view (2ω): 152°,
Focal length of the third lens (f3): 1.70 mm,
f3/f: 1.490, f/D: 0.253,
Back focus (in glass): 2.2 mm

| Surface | Surface type | Radius of curvature | Distance between surfaces | Refractive index: nd | Abbe number: νd |
|---|---|---|---|---|---|
| S1 | Spherical | 40.339 | 0.950 | 1.704 | 48.4 |
| S2 | Spherical | 3.836 | 3.993 | | |
| S3 | Aspherical | 4.593 | 3.385 | 1.6209 | 24.0 |
| S4 | Aspherical | 3.191 | 0.172 | | |
| S5 (Aperture) | | | 0.275 | | |
| S6 | Aspherical | 11.421 | 1.790 | 1.5251 | 56.0 |
| S7 | Aspherical | −0.922 | 1.6 | | |
| S8 | | | 0.3 | | |
| S9 | | | 0.3 | | |

Table 6 shows constants and coefficients for specifying the aspherical shape of the lens surfaces that are specified as aspherical in Example 3. Each symbol in Table 6 follows the description of Table 2.

TABLE 6

| Aspherical coefficients | | | | |
|---|---|---|---|---|
| | S3 | S4 | S6 | S7 |
| Conic constant (K) | 2.289 | 0.000 | 0.000 | −1.166 |
| 4th order coefficient (A) | 7.383E−03 | 2.151E−02 | −3.076E−01 | −1.303E−02 |
| 6th order coefficient (B) | 5.561E−04 | 6.521E−01 | 9.040E−01 | −2.875E−03 |
| 8th order coefficient (C) | −4.972E−05 | −2.472E+00 | −1.518E+00 | −3.186E−03 |
| 10th order coefficient (D) | 6.067E−06 | 3.396E+00 | 9.554E−01 | −5.691E−03 |

Figure 4A:
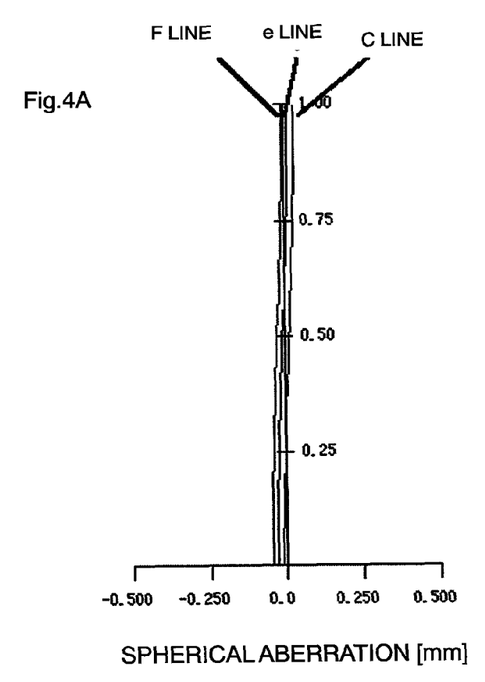
FIG. 4A is a spherical aberration diagram of a wide angle lens having lens data of Example 3.
Figure 4B:
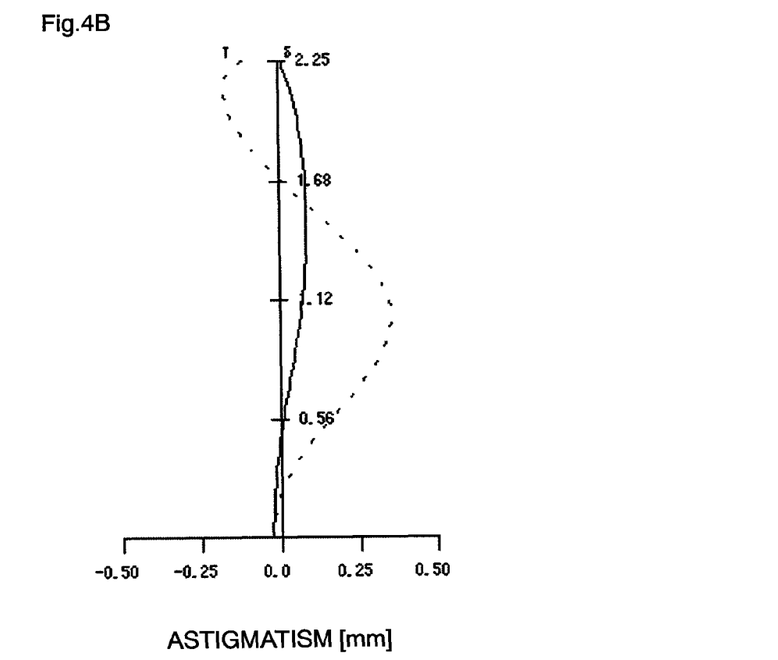
FIG. 4B is an astigmatism diagram of the wide angle lens having the lens data of Example 3.
Figure 4C:
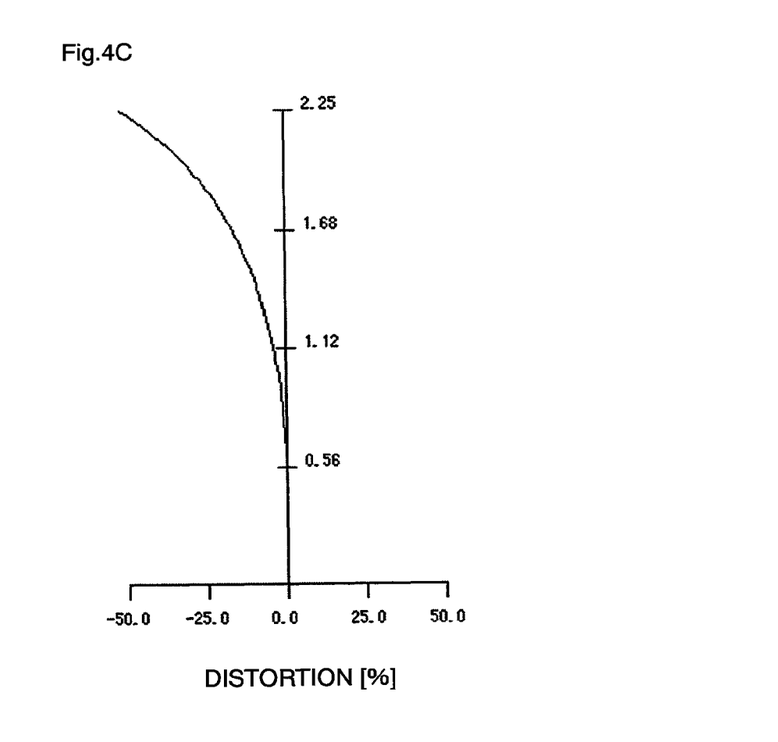
FIG. 4C is a distortion diagram of the wide angle lens having the lens data of Example 3.

FIGS. 4A to 4C are aberration diagrams of the wide angle lens having the lens data of Example 3. FIG. 4A is a spherical aberration diagram, FIG. 4B is an astigmatism diagram, and FIG. 4C is a distortion diagram. Each aberration diagram shows aberration using e line as a reference wavelength. The spherical aberration diagram (FIG. 4A) also shows aberration at C line and F line. In the astigmatism diagram (FIG. 4B), the solid line shows aberration in the sagittal direction and the dashed line shows aberration in the tangential direction. The vertical and horizontal axes of each aberration diagram follow the description of FIG. 2.

Distortion (Di): −52.0%
Chromatic aberration of magnification (60%) C-e: 9.3 μm
Chromatic aberration of magnification (60%) F-e: −7.0 μm While there has been described in detail a wide angle lens of the invention by illustrating an embodiment, the scope of the invention is not limited thereto, and modifications and variations may be made thereto within the claimed scope according to purposes.

INDUSTRIAL APPLICABILITY

As described above, the invention has advantages of being able to reduce chromatic aberration of magnification, facilitate the manufacture of lenses, and reduce distortion with use of a small number of lenses, and is useful for a wide angle lens that is used for a small camera, typified by an in-vehicle camera, a cell phone camera, a PC camera, a surveillance camera, or the like, which uses an imaging device, such as a CCD and a CMOS.

The invention claimed is:

1. A wide angle lens comprising a lens system consisting of: a first lens, a second lens, and a third lens which are arranged in order from an object side; and an aperture provided between the second lens and the third lens, wherein:
the first lens is a spherical meniscus lens which has negative power and whose convex surface faces the object side;
the second lens is an aspherical meniscus lens which has negative power along an optical axis and has positive power off the optical axis and whose convex surface faces the object side;
the third lens is a lens which has positive power;
the Abbe number of the second lens is 30 or less;
the ratio between the diagonal length D of an imaging device placed on an image plane of the lens system and the focal length f of the whole of the lens system, f/D, is 0.26 or less; and
the ratio between the focal length f3 of the third lens and the focal length f of the whole of the lens system, f3/f, is less than 1.5.

* * * * *